3,137,664
WATERPROOF PLASTIC FILMS OF INCREASED WATER VAPOR PERMEABILITY AND METHOD OF MAKING THEM
Joseph Shulman, Dorchester, and John T. Howarth, Reading, Mass., assignors to Arthur D. Little, Inc., Cambridge, Mass., a corporation of Massachusetts
No Drawing. Filed June 21, 1960, Ser. No. 37,554
16 Claims. (Cl. 260—17.4)

This invention relates to a method for increasing the water vapor permeability of waterproof plastic films, and to the films so prepared.

There is extensive and increasing demand for films which prevent the passage of liquid water (i.e. which are waterproof) but which permit the passage of water vapor (i.e. which "breathe"). A typical use for such films is in clothing, particularly in garments such as rainwear, which though intended primarily to protect the wearer against the elements, nevertheless should have moderate water vapor permeability in order that they may be worn comfortably. In other words, these garments "breathe," and so release the uncomfortable humidity which would otherwise build up inside the garment due to perspiration or transpiration of the wearer. Other uses for such films are as shoe uppers, bandages, and domestic and industrial upholstery (e.g. for automobiles and boats), wherein lack of water vapor permeability results in discomfort to the user because of the above-mentioned humidity build-up.

Waterproof plastic films adequately permeable to water vapor are already known. Such films may be inherently so permeable, or they may have been made so by suitable treatment. However, these permeable films suffer from one or another disadvantage such as low strength or tear resistance, ease of soiling, difficulty in cleaning, poor appearance or relatively high cost.

Known methods of making normally non-permeable plastic films permeable to water vapor, while remaining waterproof, involve the incorporation of water-soluble agents which are intimately mixed with the plastic prior to sheeting, and then washed out of the finished sheet to provide a spongly or porous product; or the perforation of the finished sheet with many minute holes throughout its area. The use of water-soluble agents that are washed out to leave a porous structure, e.g., various water-soluble inorganic salts which are dispersed throughout the plastic in the form of particles or crystals and which are insoluble therein, results in a very weak and easily ruptured product. This product is also readily soiled because of the holes which give it its water vapor permeability. The perforated sheet suffers from the same disadvantages.

It is accordingly an object of this invention to prepare waterproof plastic films having improved water vapor permeability.

Another object is to prepare such films which are relatively strong and have good tear and abrasion resistance, which do not soil readily, and which can be cleaned with relative ease.

Still another object is to prepare such films which retain their vapor permeability properties without substantial change throughout their useful life.

A further object is to prepare such films which are relatively inexpensive and do not require a significant amount of special apparatus for their manufacture.

Other objects will appear from the disclosure which follows.

Contrary to what would be expected from the experience of prior workers in this field, we have found that we are able to attain a desired and controlled degree of water vapor permeability in normally vapor-impermeable waterproof plastic films by incorporating in specified proportions, with the plastic composition from which such films are formed, a water-sensitive compound which has a composition, particle size, and other properties and characteristics as hereinafter set forth, and which, though water-sensitive, is substantially water-insoluble in its association in the final film. By suitable selection of the water-sensitive compound within the prescribed ranges of properties, and in desired proportions, the final plastic film may have, and retain throughout its useful life, a water vapor permeability of as high as 10 to 15 times that of the untreated film without, however, encountering the drawbacks of lack of strength, ease of soiling, poor appearance, solubility, etc. which have plagued the prior art processes.

Any water-insoluble film-forming plastic material which is normally substantially impervious to water vapor transmission may be treated according to this invention. Such materials include polyvinyl chloride, polyethylene, polyurethane, polypropylene, nylon, polytetrafluoroethylene, polyvinylidene chloride, copolymers such as butadiene-styrene and butadiene-acrylonitrile, and natural rubber. These plastic materials are characterized by having a low water vapor permeability constant, as determined by ASTM method E–96–53T. That method expresses the permeability in terms of grams of water vapor passed through the film per 100 square inches of film area per mil thickness per 24 hours, at 100° F. and 90% R.H. In relatively thin films of the type herein referred to, the permeability is inversely proportional to the film thickness.

The low permeability constant referred to above is of course different for different plastic materials of the class above mentioned. Thus, in the cases of polyvinyl chloride and natural rubber, for example, it ranges around 12 to 20, in the case of polyvinylidene chloride, less than about 3, and in the case of polyethylene, less than one.

Reference has already been made herein to the fact that the plastic films of this invention may have as much as 10 to 15 times the water vapor permeability of the same films untreated. Thus, a film of polyvinyl chloride and a film of polyethylene may be prepared in identical fashion in accordance with this invention, and have water vapor permeability constants of 200 and 12 respectively. Nevertheless, this represents a larger proportional increase in permeability constant for the polyethylene than it does for the polyvinyl chloride, and opens new uses for the former just as it does for the latter.

The water-sensitive material incorporated with the plastic material becomes more effective as its ability to absorb water increases, and yet it must be sufficiently water-insoluble that the final film will not lose more than 5% in weight, by dissolving out of the water-sensitive material, upon soaking the film in water. Excessive absorptivity results in weakening of the film. Greater solubility in water results in gradual washing away of the incorporated material. To be sure, some of the material washes or dissolves out even at the specified low solubility, but such washing out is little enough so that the product film lasts its expected life in normal use before washing out becomes at all significant.

The water-sensitive material is in discrete solid particle form. The particles are of such a size that they provide direct contact from one face of the film to the other through single particles, or through a series of particles in direct contact with each other from face to face of the film. Preferably, the major portion of the particles are of sufficient size to extend through the film from face to face. In order to accomplish these objectives we select the particles, as by screening, of a size close to that of the final film to be prepared, and preferably somewhat larger in size. For best results, the particles in any given formulation will extend over a size range of 50% to 150% of the thickness of the sheet to be prepared, and preferably a size range of about 75% to 125% of such thickness. Particles which are of greater diameter than the film thickness are, of course, reduced in size or otherwise rearranged or oriented so that they do not project significantly beyond the film surfaces. If the particles are too large, the film has a mottled appearance and tends to be weak. If the particles are too small, the vapor transmission becomes poor, for reasons set forth below. As a practical matter, particles ranging in size between about 70 and 150 microns are most suitable for films ranging in thickness between about 3 mils and 6 mils. The larger particles are preferable for the thicker films, and the smaller particles for the thinner films. The films with which this invention is concerned are in the general thickness range of one to 10–15 mils.

It should be understood that the films of this invention may be constructed with integral reinforcing ribs considerably thicker than the principal portion of the film, i.e. that portion responsible for substantially all of the vapor transmission. When reference is made to film thickness, the principal portion of the film, and not the ribs, is meant, unless the text directs otherwise. This principal portion of the film will generally occupy at least one-half the total area of the film, in order to provide an effective product.

The water-sensitive material must also be insoluble in the water-insoluble plastic material, but miscible therewith to form a homogeneous film.

The amount of water-sensitive material incorporated with the plastic material ranges between about 20 and 50% of the plastic material, by weight. Lesser amounts of the water-sensitive material result in inadequate water vapor permeability; larger amounts excessively reduce the tensile strength of the finished film. The particles of water-sensitive material in the final film, when present in an amount and size within the ranges specified, preferably extend across the film from face to face, or they provide particle-to-particle contact across and throughout the film, or so nearly provide such contact that the amount of film between particles is so small that its resistance to vapor transmission is greatly reduced. Inasmuch as the permeability of the film alone is inversely proportional to its thickness, the amount of film between most of the adjacent particles is thin enough that its permeability to water vapor is fairly substantial. In any event, a substantial proportion of the particles should be of sufficient size to extend across the films from face to face. The plastic material thus forms the continuous phase of the film, and the water-sensitive material forms the discontinuous phase, being uniformly dispersed throughout the continuous phase, but in sufficient amount to be at least in point-to-point contact, or substantially so, from particle to particle in all directions throughout the film.

The water-sensitive material which is particularly useful for the purposes of the present invention is starch which either is insoluble or has been insolubilized, so that it exhibits the desired low water-solubles content of the final film which contains it. Modified starches which have been precooked to make them more water-soluble are not suited for the purposes of this invention if they are sufficiently soluble so that they can be dissolved out of the film, as they would thus leave a porous structure having the drawbacks of weakness, easily soiling, etc., already mentioned for such structures.

Various methods are known for insolubilizing a solubilized starch which has been thus modified. Any of these methods can be used in the procedure of this invention provided that they result in a sufficiently insolubilized starch so that the final film has a water-solubles content of less than about 5%. Among insolubilizing methods may be mentioned the treatment with formaldehyde or other aldehydes such as paraformaldehyde, acetaldehyde, or glyoxal, or with melamine-urea resins.

The particles of insoluble or insolubilized starch possess water absorptive properties, and they increase, in the range of magnitude herein mentioned, the water vapor permeability of the final film in which they are incorporated. Nevertheless, the particles remain relatively insoluble as measured by water soak tests. Characteristics of the insoluble or insolubilized starch when incorporated into a plastic film in the proportions herein specified are such that the water-solubles (which are principally the insolubilized starch), on a 24-hour soak, are no greater than about 5%. Nevertheless, the water vapor permeability of the finished film is significantly increased above that of the same film without the insoluble or insolubilized starch particles.

Any starch may be used for the purpose of this invention, e.g. corn, tapioca, potato, wheat, sago, arrowroot, waxy sorghum, etc., provided that it has the desired property of insolubility.

The following examples, which are intended to be illustrative rather than limiting, will serve to describe this invention in more detail. Parts are by weight. The screen sizes referred to in these examples and elsewhere herein are U.S. Standard Sieve Series.

*Example I*

Commercially available insoluble starch designated as "Pearl" starch (available from National Starch Co., New York, New York), was used in this example. This starch was completely insoluble in cold water, but was capable of absorbing moisture. This insoluble starch was screened, and the product that passed through a 100 mesh screen and that was retained on a 200 mesh screen was used in the following step. About 15% of these particles were retained on a 140 mesh screen and the balance passed through it.

This insoluble starch was milled into a plasticized polyvinyl chloride resin on a two-roll mill heated at 300° F., thoroughly mixed there and then sheeted off. The film was then placed in an oven at 375° F. for two minutes to ensure complete fusion of the film. Samples of the film were evaluated for water vapor permeability and water solubles with the following results:

Water vapor permeability constant _____ 23
Water solubles (24-hour soak)_____Less than 1%

These samples were 3 to 5 mils in thickness, throughout their area. The films were strong, clear and waterproof, and met all the requirements herein set forth for a good product in accordance with this invention. Control samples of polyvinyl film showed a permeability constant of 13 and water solubles of less than 1%. The composition of the test samples was as follows:

Material: Percent by weight
Polyvinyl chloride resin (Goodyear Pliovic DB–90V) _____ 49.50
Di-2-ethyl hexyl phthalate (plasticizer)_____ 24.25
Barium cadmium naphthenate soap, (stabilizer) _____ 1.00
Insoluble starch_____ 24.25

*Example II*

Although the film of Example I has nearly twice the water vapor permeability of untreated film, it is usually desirable to increase this permeability still further. This can be done by giving the starch a slight degree of solubility, and providing a somewhat larger average particle size, as described in this Example II.

Commercially available finely ground raw cornstarch which was insoluble in cold water was put into hot water at 80° C. in the proportion of 50 parts starch to 1000 parts water. The solution was heated for 15 minutes, thereby rendering the starch somewhat soluble in hot water, and then poured slowly into 2000 parts ethyl alcohol with constant agitation. A precipitate formed and this was filtered and washed with ethyl alcohol solution. The product was then dried at 110° C. for three hours, ground and screened and the product that passed through a 100 mesh screen and that was retained on a 200 mesh screen was used for the following step. This product was composed about 70% of particles of 100–140 mesh and about 30% of particles of 140–200 mesh.

These starch granules, which were still relatively insoluble in cold water, were then milled into a plasticized polyvinyl chloride resin on a two-roll mill at 300° F., thoroughly mixed there and then sheeted off. The film was then placed in an oven at 375° F. for two minutes to ensure complete fusion of the film. Samples of the film were evaluated for water vapor permeability and water solubles with the following results:

Water vapor permeability constant_____ 188
Water solubles (24-hour water soak)_____percent__ 5.3

These samples were 5 to 5.8 mils in thickness, throughout their area. The films were strong, clear and waterproof and met all the requirements set forth for a good product in accordance with this invention. The composition of the test sample was identical with that of Example I, except for the nature of the starch component.

*Example III*

Commercially available finely ground raw cornstarch, the same as that in Example II, was mixed with water at 80° C. in the proportion of 50 parts starch to 1000 parts water as described in that example. In this instance, 14 parts 37% formaldehyde solution were added and stirred for 15 minutes, in order to render the starch less soluble. Thereafter, procedure and proportions were the same as those described in Example II. Tests on the resulting polyvinyl film of the same thickness showed a water vapor permeability constant of 216 and water solubles of 4.7%.

The foregoing examples illustrate methods of controlling or modifying the solubility of the starch so that various desired degrees of water vapor permeability and water solubles content can be obtained. It should be further observed here that if the procedure of Example I is followed, but using a starch modified by precooking to make it somewhat soluble in cold water, the resulting film, though otherwise satisfactory, shows a water soluble content of about 8%, which is too high for most purposes.

*Example IV*

"Pearl" starch, the same as that used in Example I, was milled with three times its weight of polyethylene on a 2-roll mill at 250° F., and after thorough mixing was sheeted off in the form of a film about 4 mils thick. Samples of this film were evaluated for water vapor permeability, and for water solubles on a 24-hour water soak, with the following results:

Permeability constant_____ 18
Water solubles_____percent__ 0.0

For polyethylene sheets of like thickness but without the starch, the water vapor permeability constant is less than 1% and the water solubles on the 24-hour water soak are zero.

*Example V*

"Pearl" starch, the same as that used in Example I, in the form of a methyl ethyl ketone solution, 26.7% solids, was thoroughly mixed with a 20% solution of polyvinylidene chloride resin ("Saran F-220," Dow Chemical Company) in methyl ethyl ketone, in the ratio of one part starch to three parts resin. This is formed into a sheet about 4 mils thick. Samples thereof are found to have a permeability constant of 21.5, as compared with 2.3 untreated. The amount of water solubles, on 24-hour water soak, is approximately 1% in each case.

*Example VI*

"Pearl" starch, the same as that used in Example I, was thoroughly milled into natural rubber and conventional compounding ingredients on a 2-roll mill, sheeted off, and then cured, in the form of a film about 4 mils in thickness. The formulation was as follows (parts are by weight):

Pale crepe_____ 100
Zinc oxide_____ 5
Stearic acid_____ 2
Sulfur _____ 1.75
Accelerators _____ 2.5
Antioxidants _____ 1.5
Softener _____ 1
Starch _____ 30
                                              _____
                                              143.75

Samples of this film were evaluated for water vapor permeability, and for water-solubles on a 24-hour water soak, with the following results:

Permeability constant_____ 26
Water solubles_____percent__ 0.7

Natural rubber films made in identical manner except for omission of the starch showed permeability constant of 21 and water solubles of 0.5%.

Our copending application, Serial No. 37,623, filed June 21, 1960, now United States Patent 3,081,270 describes and claims a process for imparting water vapor permeability to waterproof plastic films, and the resulting product, wherein the water-sensitive material is an insolubilized carboxymethyl cellulose.

We claim:

1. A waterproof plastic sheet having water vapor permeability, consisting essentially of a waterproof, water-insoluble, film-forming plastic material which is normally substantially impervious to water vapor transmission and particles of substantially water-insoluble starch uniformly dispersed therein, said particles being present in an amount between 20% and 50% of said plastic material, by weight, and insoluble therein, and providing direct contact through said particles from one face to the other of said sheet, said sheet containing a maximum of about 5% of water-soluble material, said starch being sufficiently insoluble in water that the aforesaid range of water-soluble material is achieved.

2. A sheet in accordance with claim 1 characterized by having a thickness of 3 to 6 mils and containing said particles of 70 to 150 microns in size.

3. A sheet in accordance with claim 1 wherein said plastic material is polyvinyl chloride.

4. A sheet in accordance with claim 1 wherein said plastic material is polyethylene.

5. A sheet in accordance with claim 1 wherein said plastic material is polyvinylidene chloride.

6. A sheet in accordance with claim 1 wherein said plastic material is natural rubber.

7. A plastic sheet having water vapor permeability, said sheet consisting essentially of a waterproof, water-insoluble, film-forming plastic material which is normally substantially impervious to water vapor transmission and uniformly dispersed therein particles extending from one face of said sheet to the other, said particles being insoluble in said plastic material and consisting essentially of water-insoluble starch, said sheet having a solubility in water of not more than about 5%, on a 24-hour water soak, said particles being present in an amount between 20% and 50% of said plastic material, by weight.

8. A sheet in accordance with claim 7, characterized by having a thickness of one to 15 mils.

9. sheet in accordance with claim 8, wherein said sheet is provided with ribs in the form of raised portions of said sheet extending over a minor portion of the surface of said sheet.

10. A sheet in accordance with claim 7, wherein said starch is an aldehyde-insolubilized starch.

11. Process of making a plastic sheet having water vapor permeability which comprises mixing finely divided particles of starch substantially insoluble in water with a waterproof, water-insoluble plastic film-forming material which is normally substantially impervious to water vapor transmission and forming a sheet of one to 15 mils thickness with said particles interspersed uniformly and substantially continuously throughout the sheet between its faces, said particles as added to the film-forming material having a size range such as to provide direct contact through said particles from one face to the other of said sheet, said particles being present in an amount between 20% and 50% of said plastic material, by weight.

12. Process according to claim 11 wherein said particles are in sizes ranging between 50% and 150% of the thickness of said sheet.

13. Process according to claim 11 wherein said film-forming material is polyvinyl chloride.

14. Process according to claim 11 wherein said film-forming material is polyethylene.

15. Process according to claim 11 wherein said film-forming material is polyvinylidene chloride.

16. Process according to claim 11 wherein said film-forming material is natural rubber.

References Cited in the file of this patent
UNITED STATES PATENTS

| | | |
|---|---|---|
| 1,245,268 | Price | Nov. 6, 1917 |
| 2,676,929 | Duddy | Apr. 27, 1954 |
| 2,824,023 | Banigan | Feb. 18, 1958 |
| 2,868,741 | Chambers et al. | Jan. 13, 1959 |
| 2,893,977 | Suen et al. | July 7, 1959 |
| 2,935,484 | Arnold et al. | May 3, 1960 |
| 3,067,152 | Fukushima et al. | Dec. 4, 1962 |